United States Patent [19]

Burck et al.

[11] Patent Number: 5,731,544

[45] Date of Patent: Mar. 24, 1998

[54] ELECTRICAL OUTDOOR OUTLET COVER

[75] Inventors: Bruce Burck, Bridgewater; Gerald Osofsky, Cranford; Albert Banda, Edison, all of N.J.

[73] Assignee: Mulberry Metal Products, Inc., Union, N.J.

[21] Appl. No.: 313,882

[22] Filed: Sep. 28, 1994

Related U.S. Application Data

[63] Continuation-in-part of Ser. No. 176,779, Jan. 3, 1994, abandoned.

[51] Int. Cl.$^6$ .................. H05K 5/03; H02G 3/14
[52] U.S. Cl. .................. 174/66; 220/241; 220/3.8
[58] Field of Search .............. 174/66, 67; 220/241, 220/242, 3.8

[56] References Cited

U.S. PATENT DOCUMENTS

| | | | |
|---|---|---|---|
| 3,140,344 | 7/1964 | Slater et al. | 174/67 |
| 4,381,063 | 4/1983 | Leong | 220/242 |
| 4,740,655 | 4/1988 | Ford | 174/67 |
| 4,874,906 | 10/1989 | Shotey | 174/67 |
| 4,979,634 | 12/1990 | Begley | 220/242 |
| 5,218,169 | 6/1993 | Riceman | 174/67 |
| 5,230,525 | 7/1993 | Delmerico et al. | 280/47.131 |
| 5,243,135 | 9/1993 | Shotey | 174/67 |
| 5,245,507 | 9/1993 | Ericksen | 174/67 X |
| 5,280,135 | 1/1994 | Berlin et al. | 174/67 |
| 5,317,108 | 5/1994 | Prairie, Jr. | 174/67 |
| 5,527,993 | 6/1996 | Shotey et al. | 174/667 |
| 5,531,345 | 7/1996 | Nakamura et al. | 220/3.8 |

*Primary Examiner*—Kristine L. Kincaid
*Assistant Examiner*—Dean A. Reichard
*Attorney, Agent, or Firm*—McAulay Fisher Nissen Goldberg & Kiel, LLP

[57] ABSTRACT

The outdoor electrical outlet cover is provided with two free-ended hinge pins along one side and a box-shaped lid which is slid laterally onto the hinge pins. The base plate may be secured in place in the field and the box-shaped lid slid into place after mounting of the base plate. A latch is mounted on the lid for engagement under a detent on the base plate to secure the lid in place. When closed, the lid is completely sealed relative to the base plate about the periphery.

22 Claims, 4 Drawing Sheets

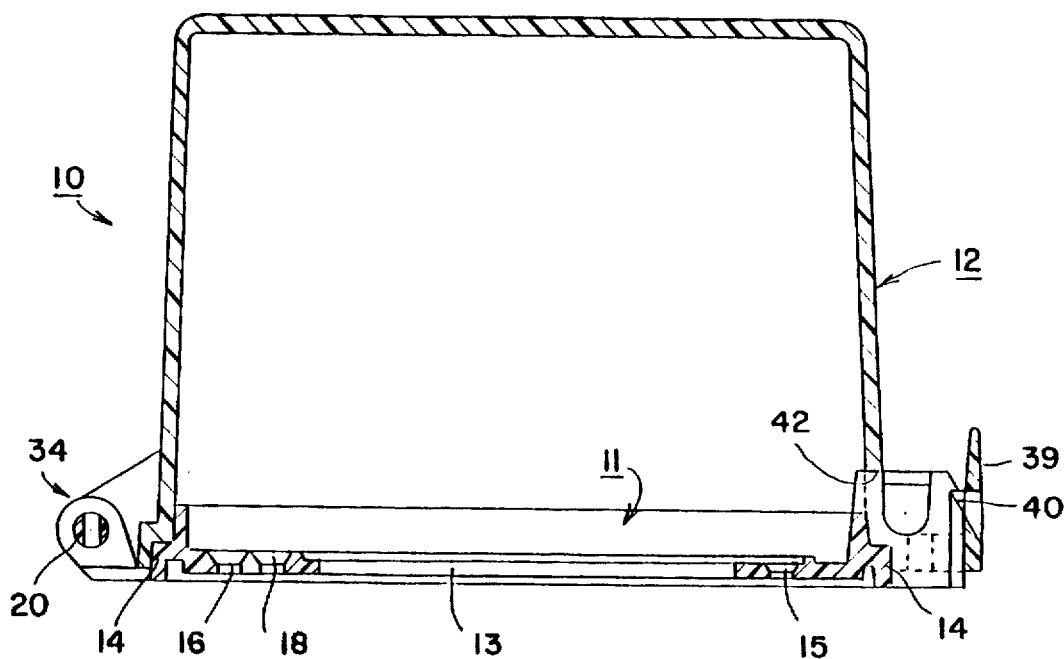
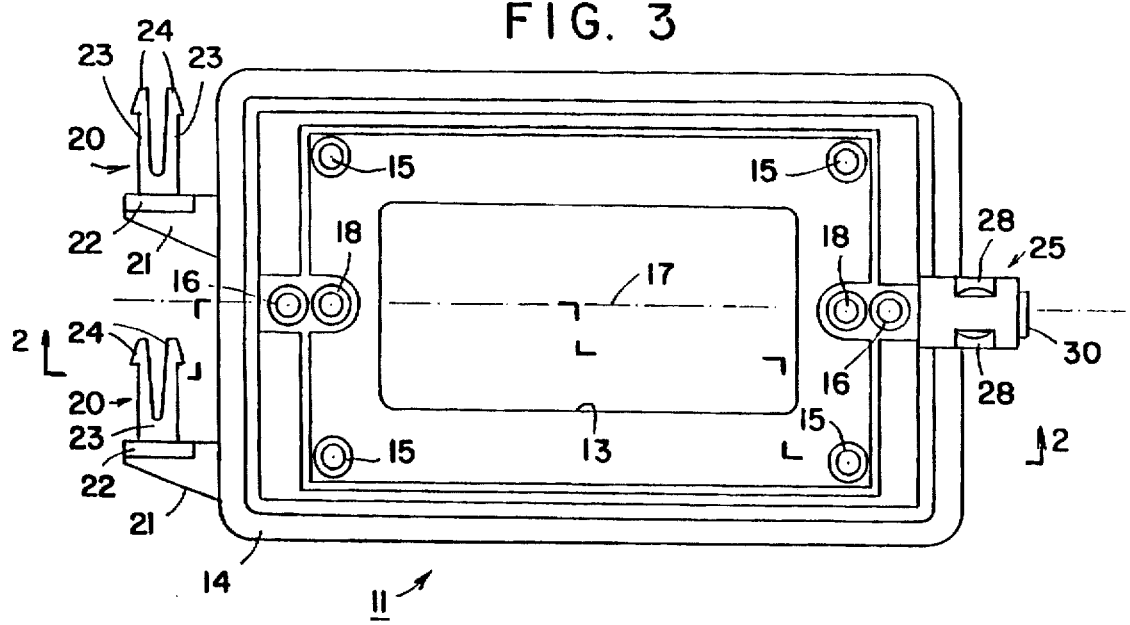
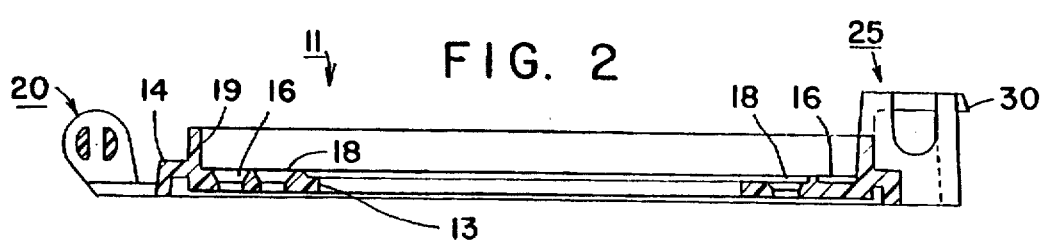

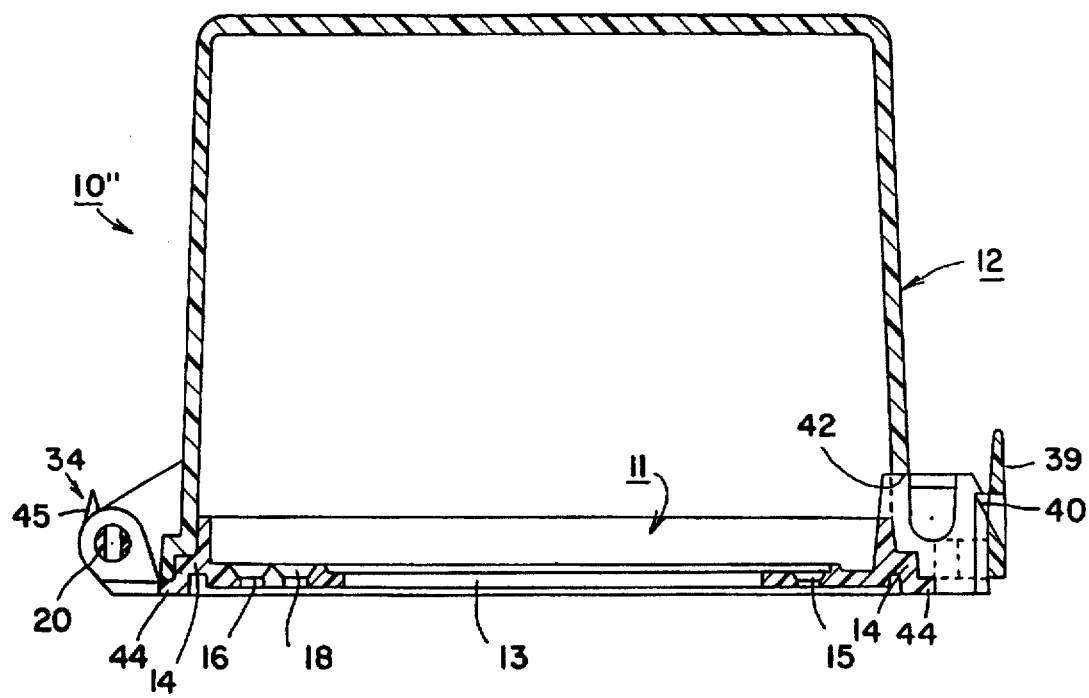
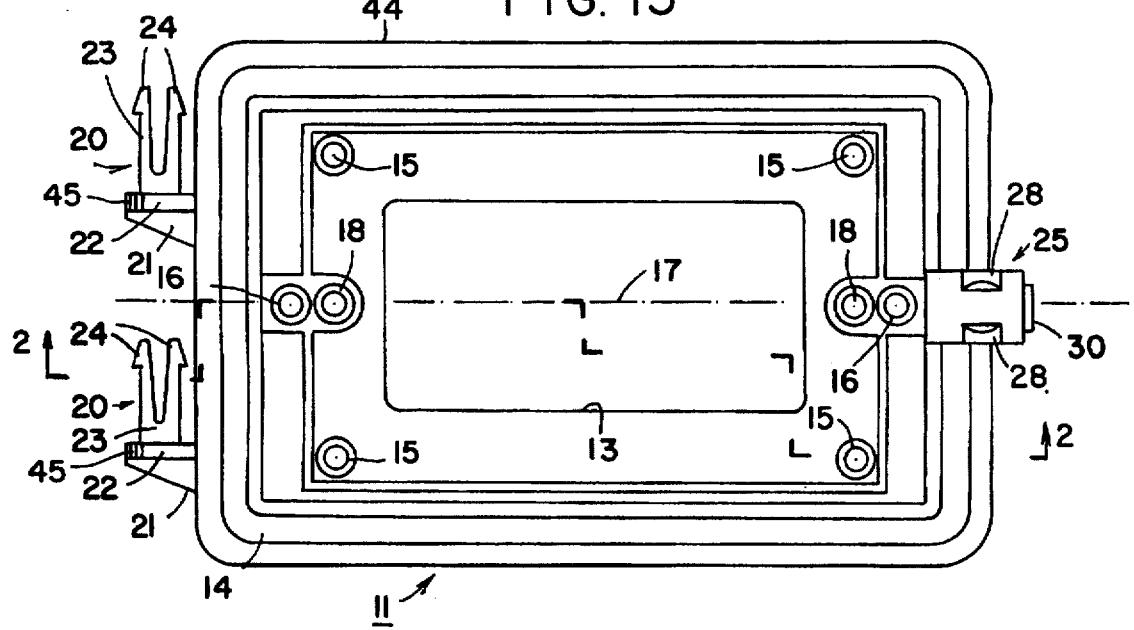
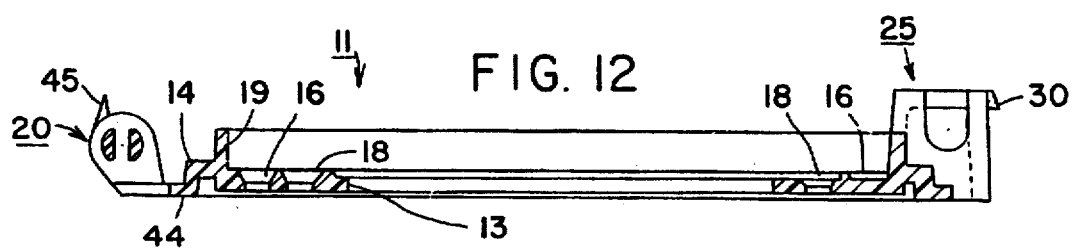

ELECTRICAL OUTDOOR OUTLET COVER

This application is a continuation-in-part application of pending application Ser. No. 08/176,779, filed Jan. 3, 1994, now abandoned.

This invention relates to an electrical outdoor outlet cover. More particularly, this invention relates to a weather-proof electrical outdoor outlet cover.

As is known, various types of weather-proof boxes and covers have been used in outdoor environments in order to protect an electrical outlet particularly from rain, splashes, snow and the like. In simple cases, covers can be mounted over the electrical outlets and secured in place in a permanent manner. However, where power cords are to be plugged into the outlets, there is a need to remove or lift the cover away from the electrical outlets so as to permit the power cord to be inserted into the electrical outlet while at the same time allowing the cover to be placed back over the cover and power cord. In this respect, many building codes require that the cover be automatically returned from an opened condition to a closed condition after a power cord has been removed from the electrical outlet.

In some cases, such as described in U.S. Pat. No. 3,686,425, it has been known to provide a box with a hooded cover which is spring loaded to pivot downwardly to close over an electrical outlet. However, covers of this type do not provide adequate protection when an electrical appliance is plugged into an outlet. Specifically, in this condition, the cover is prevented from fully closing due to the presence of a cord extending from a plug in the outlet to the appliance. As a result, an opening remains into the outlet area from below through which rain water may splash or through which a spray of water may pass.

It has also been known to construct plug receptacles, for example, as described in U.S. Pat. Nos. 629,445 and 900,773 with hinged doors or lids to close over a plug inserted into an electrical outlet. In some cases, the hinged doors are provided with cutouts which are sized to a given plug size in order to cover over the plug. In other cases, an opening is provided by the doors to afford clearance for a wire leading from the plug while at the same time being sized to allow withdrawal of the plug.

U.S. Pat. No. 4,109,095 describes a box cover having a pair of lids which are pivotally mounted to move between a closed position over an opening in a housing and an opened position to permit access to the interior of the housing and an electrical outlet therein. In this construction, each lid is provided with a resilient sealing strip or gasket along one edge so as to deform and resiliently engage against a cord extending from the cover. Typically, such a box cover is employed in a horizontal plane so that one lid opens upwardly while the other lid opens downwardly. Should the box be oriented vertically, a situation may arise where rain water may collect on the exposed ends of the covers and pass into the interior of the box cover, particularly along the line at which the lids engage against each other. Further, such spring-loaded covers require manual manipulation in order to be held open while a plug is being inserted.

U.S. Pat. Nos. 4,874,906 and 4,803,307 describe an outlet cover which includes a mounting plate to be secured over an outlet housing and a lid member mounted over the mounting plate. In one embodiment, the lid member includes a hook portion which engages about a lip of the mounting plate to pivotally mount the lid member on the mounting plate. However, in order to gain access to an electrical outlet, the lid member must be pivoted upwardly about the top of the mounting plate. Since there is no fixed connection between the lid and the mounting plate, there is a significant chance that the lid will become separated from the mounting plate. In such cases, remounting of the lid on the mounting plate may be inconvenient for the user. There is also a risk that the lid may become damaged while being manipulated back into place over a power cord or may simply not be replaced by the user. In addition, as a sealing gasket is described as being disposed within a lip element on the periphery of the lid, repeated removal of the lid from the mounting plate to gain access to an electrical socket over a period of time may result in damage to the sealing gasket if not loss of the gasket. Still further, a latch mechanism in the form of a leaf spring is described as releaseably holding the lid in a closed position over the mounting plate with a button provided on the leaf spring which projects downwardly through a wall of the lid to permit flexing of the leaf spring in order to release the latching mechanism. However, such a leaf spring arrangement may fatigue or become loose over a period of time.

Other types of outdoor outlet covers have also been known which employ lids which are hinged to mounting plates. However, these outdoor outlet covers generally have a permanent connection between the lid and mounting plate so that mounting in the field can become cumbersome. Further, should a lid or mounting plate become damaged in transport, the entire unit must be discarded.

Accordingly, it is an object of the invention to provide an outlet cover formed of a base plate and a lid which can be separately assembled and which become permanently connected in hinged relation once assembled.

It is another object of the invention to avoid the need for a sealing gasket between a lid and a base plate of an outdoor outlet cover.

It is another object of the invention to be able to securely lock the lid of an electrical outdoor outlet cover in a closed position.

It is another object of the invention to preclude the lid of an electrical outdoor outlet cover from being inadvertently left in an opened position.

Briefly, the invention provides an outdoor electrical outlet cover comprising a base plate and a lid. The base plate is provided with at least one opening for mounting over an electrical outlet, for example, for mounting on a single gang outdoor junction box or a 2 gang outdoor junction box. The base plate also has at least one hinge pin integrally on one side and a latch receiving means mounted on an opposite side of the base plate. The lid is of box-shape and has at least one lug pivotally mounted on the hinge pin of the base plate and a latch releaseably received in the latch receiving means of the base plate.

The hinge pin of the base plate and the lug of the lid are constructed so that the lid can be mounted on the base plate after the base plate has been put in place over an electrical outlet. Thus, after mounting of the base plate, the lid is mounted on the hinge pin via the lug in a snap-fit relation so that the connection between the lid and base plate becomes permanent. For example, the hinge pin can be bifurcated into two spaced apart resilient sections of semi-cylindrical cross sectional shape while the lug has an aperture receiving the resilient sections in rotatable relation. In addition, each resilient section of the hinge pin is provided with a barb or like means on one end to retain the lug on the resilient sections of the hinge pin.

The latch receiving means on the base plate includes an upstanding box-like section having a plurality of walls with an outwardly directed detent on one of the walls while the latch includes a plate having an inwardly facing detent for engaging under the detent on the latch receiving means to lock the lid to the base plate. In addition, the latch has a pair of arms securing the plate to the lid with the arms being spaced apart to receive the box-like section of the latch receiving means therebetween. Thus, when the lid is closed over the base plate, the detent on the latch snaps under the detent of the latch receiving means securing locking the lid to the base plate.

In order to open the lid, the plate of the latch is flexed so as to release the detent on the plate from under the detent of the box-shaped section of the latch receiving means. The lid can then be pivoted away from the base plate on the hinge pin.

The base plate also has an upstanding peripheral flange about the opening for the electrical outlet while the lid has a peripheral wall disposed about and slidably engaging the flange to the base plate. This serves to seal the interior of the lid against the surrounding environment. In addition, the lid includes a stepped rim which extends from the peripheral wall and slidably engages on and about the base plate thereby enhancing the sealing effect of the lid on the base plate. This overall sealing effect is such that there is no need for a gasket between the lid and base plate.

In another embodiment, the base plate is provided with a peripheral band which extends outwardly of the stepped rim so as to receive the peripheral wall of the lid thereon. This band serves to further restrict the entry of water between the mating surfaces of the lid and base plate. In this embodiment, the peripheral wall may be slightly spaced from the upstanding peripheral flange of the base plate a small distance to avoid an interference fit therebetween.

In another embodiment, the lid is mounted on the base plate to move between a closed position on the base plate and an opened position spaced from the base plate with the center of gravity of the lid being disposed in a vertical plane spaced in front of the base plate to allow the lid to move under gravity towards the closed position. In this embodiment, the base plate includes an abutment means thereon to define the open position of the lid. For example, the abutment means may be in the form of a projection located adjacent a hinge pin.

These and other objects and advantages of the invention will become more apparent from the following detailed description taken in conjunction with the accompanying drawings wherein:

FIG. 1 illustrates a view of an assembled outlet cover in accordance with the invention;

FIG. 2 illustrates a side view of the base plate of the cover of FIG. 1;

FIG. 3 illustrates a top view of the base plate of the cover of FIG. 3;

FIG. 11 illustrates a cross sectional view of a modified outlet cover in accordance with the invention;

FIG. 12 illustrates a side view of the base plate of the modified cover of FIG. 11 with an abutment means to preclude the lid being left in an opened condition inadvertently; and FIG. 13 illustrates a top view of the base plate of FIG. 12.

Figure 5:
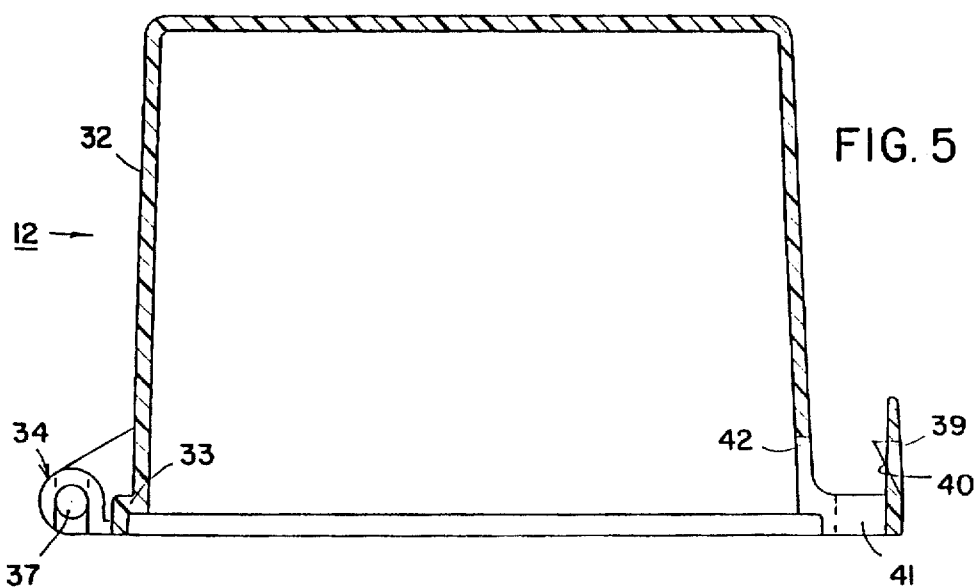
FIG. 5 illustrates a view of the lid of FIG. 4 taken on line 5—5 of FIG. 4.

Referring to FIG. 1, the outdoor electrical outlet cover 10 is constructed of a base plate 11 and a box-shaped lid 12.

Referring to FIGS. 2 and 3, the base plate 11 is of rectangular shape and has at least one opening 13 therein for mounting over an electrical outlet. In the embodiment illustrated, one rectangular opening 13 is provided to be fitted over a single or double electrical outlet unit. In addition, the base plate 11 has a rim 14 which extends around the periphery and which is of an inverted U-shaped cross section to receive a sealing gasket (not shown) for sealing against a wall in which the electrical outlets are mounted. The base plate 11 is also provided with apertures 15 each of which is located at a respective corner to permit mounting of the base plate 11 on an outdoor junction box. In addition, the base plate 11 is provided with a pair of apertures 16, 18 located on the longitudinal axis 17 of the base plate 11 for securement to an electrical device already mounted in the box, as is known, depending on the size of the electrical device. For example, the apertures 16 may be used for mounting directly to a GFI style device while the apertures 18 are used for mounting on a single receptacle.

As shown in FIG. 2, the base plate 11 has an upstanding peripheral flange 19 which extends around the four sides adjacent to the rim 14.

Still further, the base plate 11 has a pair of hinge pins 20 integrally mounted on one side and which face in the same direction on a common axis. As indicated, each hinge pin 20 is mounted in an offset manner relative to the remainder of the base plate 11 to opposite sides of the longitudinal axis 17. For example, each hinge pin 20 has a mounting plate 21 which is integral with the rim 14, an upstanding wall 22 which is integral with the mounting plate 21 and a pair of spaced apart resilient sections 23 of semi-cylindrical cross-sectional shape extending from the wall 22. Each resilient section 23 also has a means in the form of a barb 24 formed on the free end as indicated in FIG. 3 for purposes described below.

Figure 7:
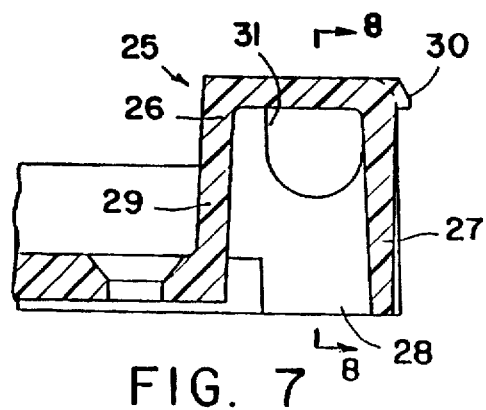
FIG. 7 illustrates an enlarged view of the latch receiving means on the base plate in accordance with the invention.
Figure 8:
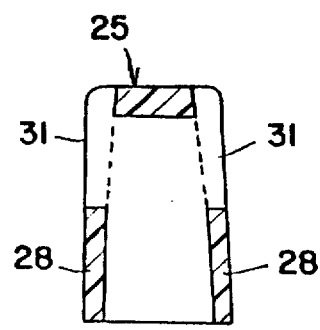
FIG. 8 illustrates a cross-sectional view of the latch receiving means taken on line 8—8 of FIG. 7.

The base plate 11 also has a latch receiving means 25 integral with a wall opposite the hinge pins 20. As illustrated in FIGS. 7 and 8, the latch receiving means 25 includes an upstanding box-like section 26 having a plurality of walls including a front wall 27, a pair of side walls 28 and a rear wall 29. In addition, a detent 30 is integrally formed on the front wall 27 at an upper end.

Each of the side walls 28 has an aperture 31 therein for the purpose of receiving a locking hasp or the like to lock the lid 12 to the base plate 11. As indicated in FIG. 8, the side walls 28 slope at a slight angle outwardly to facilitate molding and particularly mold release.

The rear wall 29 of the box-like section of the latch receiving means 25 is aligned with the peripheral flange 19 (see FIG. 2).

The base plate 11 may be made of any suitable material and is preferably made of a molded plastic one-piece construction.

Figure 4:
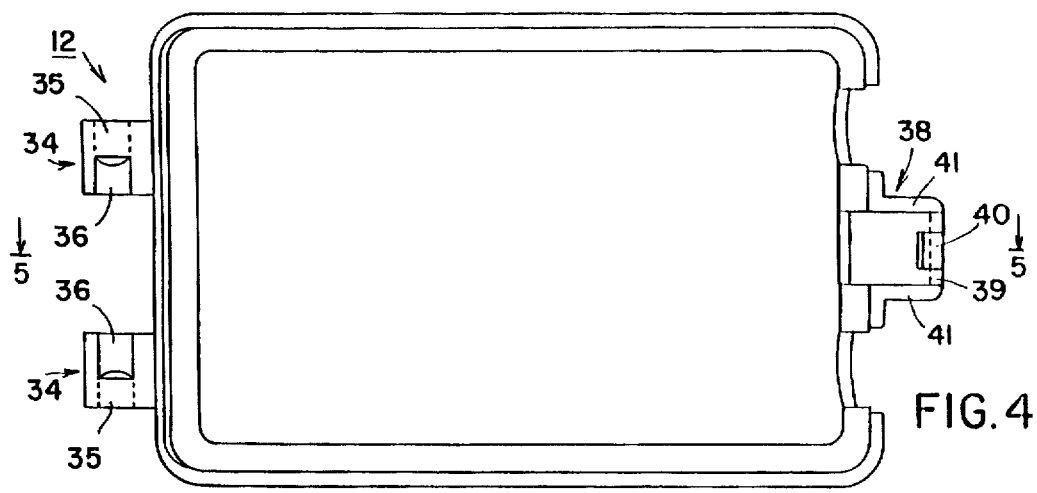
FIG. 4 illustrates a bottom view of the lid of FIG. 1.
Figure 6:
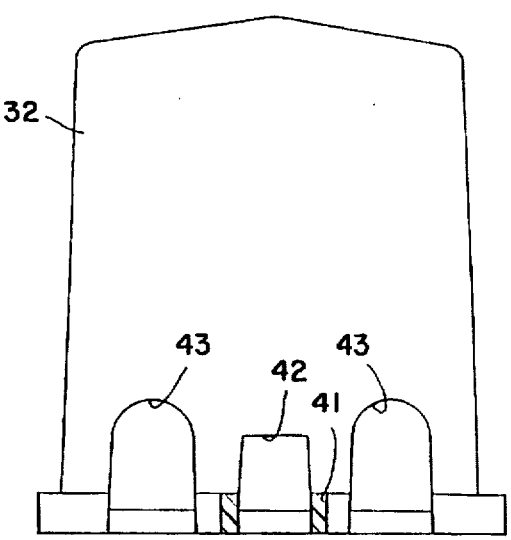
FIG. 6 illustrates a side view of the lid of FIG. 5.

Referring to FIGS. 4, 5 and 6, the lid 12 has a peripheral wall 32 which is disposed about and which slidably engages the upstanding flange 19 of the base plate 11 as indicated in FIG. 1. In addition, this peripheral wall 32 includes a stepped rim 33 which extends from the wall 32 and slidably engages on and about the rim 14 of the base plate 11. In this way, the lid 12 is sealingly disposed on the base plate 11 along two lines.

The lid 12 also has a pair of lugs 34 integral with the stepped rim 33 to one side. Each lug 34 is constructed so as to be rotatably mounted on a respective hinge pin 20. In this respect, each lug 34 includes a U-shaped section 35 and a contiguous inverted U-shaped section 36. The two sections 35, 36 serve to define an aperture 37 (see FIG. 5) for passage of a respective hinge pin 20 therethrough. As indicated in FIG. 4, the respective sections 35, 36 of the lugs 34 are reversed and are located asymmetrically of the longitudinal axis 37 of the lid 12.

As indicated in FIG. 1, each lug 34 is mounted on a respective hinge pin 20 of the base plate 11 so as to permit the lid 12 to be pivoted between a closed position as shown in FIG. 1 and an opened position (not shown) which provides access to the electrical outlets which are being closed over.

The lid 12 also includes a latch 38 which is integral with an opposite side of the lid 12 from the lugs 34 and which is located on the longitudinal axis of the lid 12. As indicated in FIG. 5, the latch 38 includes a plate 39 having an inwardly facing detent 40. This detent 40 is sized and located so as to engage under the detent 30 of the latch receiving means 25 on the base 11 as indicated in FIG. 1 when in the closed position. The latch 38 also has a pair of arms 41 which are integral with the rim 33 of the lid 12 and with the plate 39. These arms 41 are spaced apart so as to slidably receive the box-shaped section 26 of the latch receiving means 25. In this regard, the sloped side walls 28 of the latch receiving means slidably engage with the arms 41 during closing of the lid 12 on the base plate 11 and, due to the taper in the walls 28, serve to bias the latch 38 upwardly, as viewed, to force the detent 40 on the plate 39 against the detent 30 on the latch receiving means 25.

As shown in FIG. 6, the wall 32 of the lid is provided with a rectangular opening 42 so as to accommodate reception of the box-shaped section 26 of the latch receiving means 25 on the base plate 11. In addition, this wall is provided with a pair of U-shaped recesses 43 to permit passage of power cords into the confines of the closed cover 10.

The base plate 11 and lid 12 can be supplied separately to a site of installation. In this way, the base plate 11 can be readily secured in place, for example, by threading of screws through one or more of the apertures 15, 16. Thereafter, the lid 12 can be easily mounted in place. To this end, the lugs 34 of the lid 12 are aligned with the two hinge pins 20 and slid laterally until the hinge pins 20 pass through the apertures 37 of the lugs 34 and snap into place with the barbs 24 engaging on an outside of the respective lugs 34. The lid 12 can then be rotated from an opened position into a closed position with the latch plate 39 moving downwardly over the box-shaped section 26 of the latch receiving means 25 until the respective detents 40, 30 snap into engagement with each other. At this time, the lid 12 is securely locked in place relative to the base plate 11. At the same time, the rim 33 of the lid 12 is in sealing engagement with the rim 14 of the base plate 11 and the peripheral wall 32 of the lid 12 is in sealing engagement with the upstanding flange 19 of the base plate.

In order to open the cover, the latch plate 39 is manually grasped and flexed in a direction away from the lid 12 so as to disengage the detent 40 from under the detent 30 of the latch receiving means 25. The lid 12 can then be pivoted upwardly into an open position thereby providing access to the outlets (not shown).

The lid 12 is made of one-piece construction and preferably molded, for example, of a plastic material.

Figure 9:
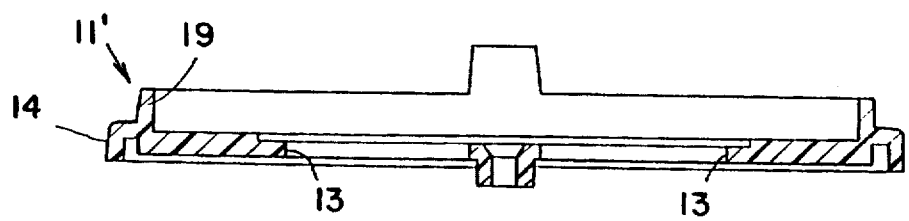
FIG. 9 illustrates a view of a modified base plate in accordance with the invention.
Figure 10:
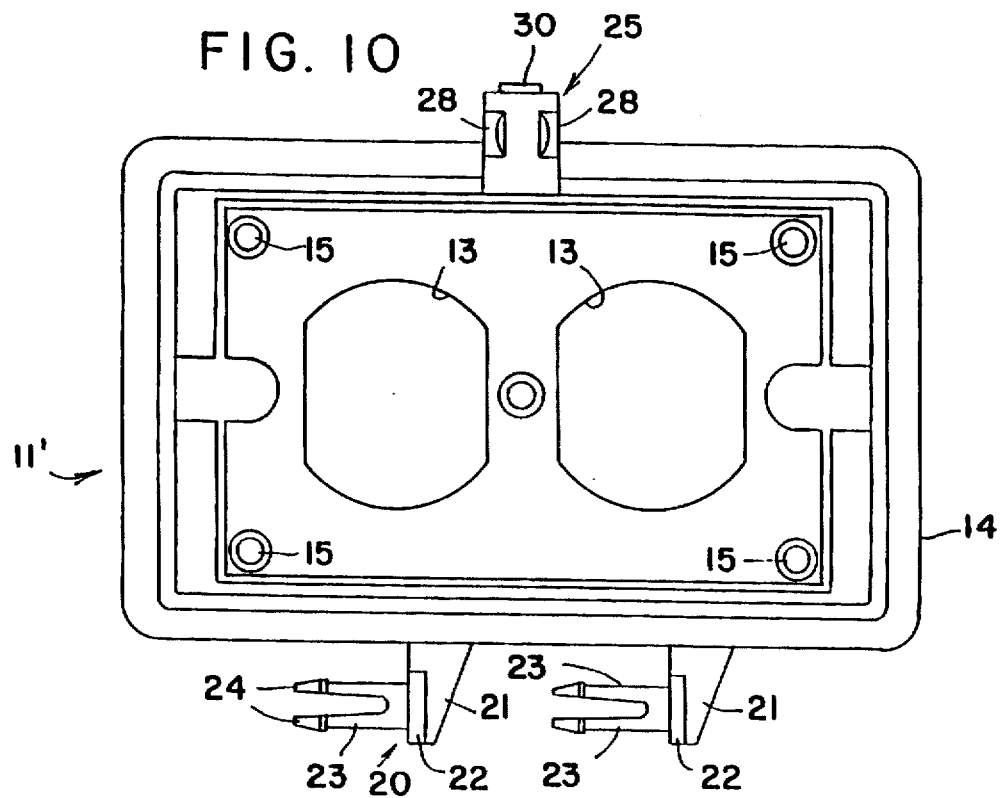
FIG. 10 illustrates a top view of a lid for use with a base plate of FIG. 9 in accordance with the invention.

Referring to FIGS. 9 and 10, wherein like reference characters indicate like parts as above, the cover 10' can be constructed with a base plate 11 having a pair of hinge pins 20 disposed on the long side with the latch receiving means 25 on an opposite side. Likewise, the lid (not shown) to be mounted on this base plate would have corresponding lugs for mounting over the hinge pins and a latch, as above, for engaging the latch receiving means 25.

The outdoor electrical outlet cover 10 may be constructed so that the hinge pins 20 are located on a vertical axis so that the lid 12 opens about a vertical axis. Alternatively, the pins 20 may be located on a horizontal axis so that the lid 12 may pivot on a horizontal axis. Likewise, the cover may be oriented to have the lid pivot on a horizontal or vertical axis.

Referring to FIG. 11, wherein like reference characters indicate like parts as above, the outlet cover 10" includes a lid 12 as constructed above. However, the cover 10' includes a base plate 11' which is provided with a peripheral band 44 which extends outwardly from the rim 14. As indicated in FIG. 11, the band 44 is sized so as to receive the stepped rim of the lid 12 when the lid is in a closed position and is of a width, e.g. of 0.125 inches. In this embodiment, the lid 12 may be slightly spaced from the peripheral flange 19 of the base plate 11' so as to avoid any interference between the lid 12 and the flange 19 when the lid 12 is being moved between the closed position shown in FIG. 11 and an opened position.

The addition of the band 44 serves to further preclude rain water or the like from entering into a space between the lid 12 and the base plate 11'. In particular, water or the like which falls unto the upper surfaces of the base plate 11' and lid 12 would at least initially be precluded from entering between the base plate 11' and lid 12 by the mating surfaces of the band 44 and the bottom of the lid 12.

The base plate 11' also includes an abutment means for limiting the movement of the lid 12 from the closed position shown in FIG. 11 to an opened position. More particularly, the abutment means serves to limit the opening of the lid 12 to a position in which the lid 12 is spaced from the base plate 11' with the center of gravity of the lid 12 being disposed in a vertical plane spaced in front of the base plate 11' (when the base plate 11' is vertical or substantially vertical) to allow the lid to move under gravity towards the closed position. As indicated in FIGS. 12 and 13, the abutment means is in the form of a projection 45 of triangular shape which is integral with and extends upwardly, as viewed, from the upstanding wall 22 on which the hinge pin 20 is mounted. As indicated in FIG. 11, the face of the projection 45 which faces the lid 12 is in a substantially vertical plane. For example, when the base plate 11' is mounted on a wall or other mounting so as to be disposed in a vertical plane, the projections 45 preclude opening of the lid 12 beyond an included angle between the base plate 11' and the lid 12 of approximately 95° to 100°.

When the lid 12 has been raised into the opened position so as to abut the projections 45, release of the lid 12 will permit the weight of the lid 12 to pivot the lid 12 downwardly towards and into the closed position on the base plate 11'. For example, the force of gravity is sufficient to bring the lid 12 into a snap-fitted closed position on the base plate 11'.

Of note, the abutments 45 may be provided on the base plate 11 in other positions so as to permit a greater opening of the lid than as described.

The invention thus provides an outdoor electrical outlet cover in which a base plate may be securely mounted in place in a simple unencumbered manner followed by mounting of the lid on the base plate in a permanent manner.

The invention also provides an outlet cover in which a lid is precluded from remaining in an opened condition through inadvertence. That is to say, if left in an open condition, the weight of the lid causes the lid to move under gravity to a closed position provided there is no interference from an intervening body.

Further, the invention provides an electrical outdoor outlet cover which does not require a sealing gasket between a lid and a base plate and in which the lid can be securely locked to the base plate when in a closed position.

Further, the invention provides an outlet cover which can be manufactured in a relatively simple manner from two pieces which can be subsequently assembled at the site in a permanent manner relative to each other. Further, the two-piece construction provides an integrated latch and latch receiving means of relatively simple construction which provide for a secure locking arrangement. In particular, the latch does not require separate pieces which would otherwise require separate assembly.

What is claimed is:

1. An outdoor electrical outlet cover comprising
   a one piece base plate having at least one opening therein for mounting over an electrical outlet, an upstanding peripheral flange about said opening, at least one hinge pin integrally mounted in offset manner relative to and parallel to one side of said plate and having a free end and a latch receiving means integrally mounted on an opposite side thereof; and
   a box-shaped lid having a peripheral wall disposed about said flange of said base plate, at least one lug pivotally mounted on said hinge pin of said base plate, and a latch releaseably received in said latch receiving means of said base plate.

2. A cover as set forth in claim 1 wherein said lid includes a stepped rim extending from said wall and slidably engaging on and about said base plate.

3. A cover as set forth in claim 1 wherein said base plate includes a peripheral rim adjacent said flange and a peripheral band extending outwardly of said rim and wherein said lid includes a stepped rim extending from said wall and disposed on said band and about said rim of said base plate in a closed position of said lid.

4. A cover as set forth in claim 1 wherein said lid is pivotally mounted on said hinge pin to move between a closed position on said base plate and an opened position spaced from said base plate with the center of gravity of said lid being disposed in a vertical plane spaced in front of said base plate to allow said lid to move under gravity towards said closed position and wherein said base plate includes an abutment means thereon to define said opened position of said lid.

5. A cover as set forth in claim 1 wherein said hinge pin is bifurcated into two spaced apart resilient sections of semi-cylindrical cross-sectional shape at said free end, and said lug has an aperture receiving said resilient sections in rotatable relation.

6. A cover as set forth in claim 5 wherein each resilient section of said hinge pin has a barb on one end thereof to retain said lug on said sections of said hinge pin.

7. A cover as set forth in claim 5 wherein each lug includes a first U-shaped section and a contiguous second inverted U-shaped section, Said sections defining said aperture for passage of said free end of said hinge pin therethrough.

8. A cover as set forth in claim 1 wherein said latch receiving means includes an upstanding box-like section having a plurality of walls and an outwardly directed detent on one wall and wherein said latch includes a plate having an inwardly facing detent for engaging under said detent of said latch receiving means and a pair of arms securing said plate to said lid, said arms being spaced apart to receive said latch receiving means therebetween.

9. A cover as set forth in claim 8 wherein said box-like section of said latch receiving means has a pair of parallel walls extending from said base plate, each said wall having an aperture therein for receiving a locking hasp.

10. an outdoor electrical outlet cover assembly comprising
    a generally flat base plate having at least one opening therein for mounting over an electrical outlet, at least one hinge pin mounted on and parallel to one side thereof with a free end and a latch receiving means mounted on an opposite side thereof; and
    a box-shaped lid separate from said base plate and having at least one lug for slidably mounting over said free end of said hinge pin of said base plate, and a latch for releaseably engaging in said latch receiving means of said base plate.

11. An assembly as set forth in claim 10 wherein said hinge pin is bifurcated into two spaced apart resilient sections of semi-cylindrical cross-sectional shape, and said lug has an aperture for receiving said resilient sections in rotatable relation.

12. An assembly as set forth in claim 11 wherein each resilient section of said hinge pin has a barb on one end thereof to retain said lug on said sections of said hinge pin.

13. An assembly as set forth in claim 11 wherein each lug includes a first U-shaped section and a continuous second inverted U-shaped section, said sections defining said aperture for passage of said hinge pin therethrough.

14. An assembly as set forth in claim 10 wherein said base plate has a peripheral flange and said lid has a peripheral wall for disposition about said flange with said lid secured to and closing over said plate.

15. An outdoor electrical outlet cover comprising
    a generally flat base plate having at least one opening therein for mounting over an electrical outlet, an upstanding peripheral flange about said opening, a pair of hinge pins integrally mounted on and parallel to one side thereof on a common axis, each said pin having a free end and a latch receiving means mounted on an opposite side thereof; and
    a box-shaped lid having a peripheral wall disposed about said flange of said base plate, a pair of lugs, each said lug being slidably mounted laterally on a respective hinge pin of said base plate for pivoting thereon, and a latch releaseably received in said latch receiving means of said base plate.

16. A cover as set forth in claim 15 wherein each said hinge pin is bifurcated at said free end thereof into two spaced apart resilient sections of semi-cylindrical cross-sectional shape, and each said lug has an aperture receiving said resilient sections of a respective hinge pin in rotatable relation.

17. A cover as set forth in claim 16 wherein each resilient section of a respective hinge pin has a barb on one end thereof to retain a respective lug on said respective hinge pin.

18. A cover as set forth in claim 15 wherein said latch receiving means includes an upstanding box-like section having a plurality of walls and an outwardly directed detent on one wall and wherein said latch includes a plate having an inwardly facing detent for engaging under said detent of said latch receiving means and a pair of arms securing said plate to said lid and receiving said latch receiving means therebetween.

19. A cover assembly as set forth in claim 15 wherein said base plate includes a peripheral rim adjacent said flange and a peripheral band extending outwardly of said rim and wherein said lid includes a stepped rim extending from said wall and disposed on said band and about said rim of said base plate in a closed position of said lid.

20. A cover assembly as set forth in claim 15 wherein said lid is pivotally mounted on said hinge pin to move between a closed position on said base plate and an opened position spaced from said base plate with the center of gravity of said lid being disposed in a vertical plane spaced in front of said base plate to allow said lid to move under gravity towards said closed position and wherein said base plate includes an abutment means thereon to define said opened position of said lid.

21. An outdoor electrical outlet over comprising a one piece base plate having at least one opening therein for mounting over an electrical outlet, an upstanding peripheral flange about said opening, at least one hinge pin integrally mounted in offset manner relative to one side of said plate and a latch receiving means integrally mounted on an opposite side thereof, said latch receiving means including an upstanding box-like section having a plurality of walls and an outwardly directed detent on one wall; and a box-shaped lid having a peripheral wall disposed about said flange of said base plate, at least one lug pivotally mounted on said hinge pin of said base plate, and a latch releaseably received in said latch receiving means of said base plate, said latch including a plate having an inwardly facing detent for engaging under said detent of said latch receiving means and a pair of arms securing said plate to said lid, said arms being spaced apart to receive said latch receiving means therebetween.

22. A cover as set forth in claim 21 wherein said box-like section of said latch receiving means has a pair of parallel walls extending from said base plate, each said wall having an aperture therein for receiving a locking hasp.

* * * * *